(12) United States Patent
Tansingco (10) Patent No.: US 8,418,293 B2
(45) Date of Patent: Apr. 16, 2013

(54) TRAVEL PILLOW PROVIDING HEAD AND NECK ALIGNMENT DURING USE

(76) Inventor: Edward Tansingco, Santa Ana, CA (US)

(*) Notice: Subject to any disclaimer, the term of this patent is extended or adjusted under 35 U.S.C. 154(b) by 265 days.

(21) Appl. No.: 12/831,829

(22) Filed: Jul. 7, 2010

(65) Prior Publication Data

US 2011/0094035 A1 Apr. 28, 2011

Related U.S. Application Data

(60) Provisional application No. 61/275,705, filed on Oct. 22, 2009.

(51) Int. Cl.
*A47C 20/00* (2006.01)

(52) U.S. Cl.
USPC ............ 5/636; 5/643; 5/644; 297/393

(58) Field of Classification Search .......... 5/636, 637, 5/640, 643, 644; 128/DIG. 23; 297/391, 297/393, 397; 602/17, 18; D6/601; D24/191
See application file for complete search history.

(56) References Cited

U.S. PATENT DOCUMENTS

| | | | |
|---|---|---|---|
| 4,034,747 A | 7/1977 | Leroy | |
| 4,285,081 A | 8/1981 | Price | |
| 4,562,833 A * | 1/1986 | Pujals, Jr. | 602/18 |
| 4,708,129 A | 11/1987 | Pujals | |
| 4,783,866 A | 11/1988 | Simmons | |
| 4,805,603 A | 2/1989 | Cumberland | |
| 4,854,306 A | 8/1989 | Pujals, Jr. | |
| 5,220,700 A * | 6/1993 | Liu | 5/636 |
| 5,544,378 A | 8/1996 | Chow | |
| 5,713,841 A * | 2/1998 | Graham | 602/32 |
| 5,974,607 A | 11/1999 | Smith | |
| 6,289,538 B1 | 9/2001 | Fidge | |
| 6,786,554 B1 * | 9/2004 | Zahiri | 297/393 |

(Continued)

FOREIGN PATENT DOCUMENTS

GB 2417896 A 3/2006

*Primary Examiner* — Robert G Santos
*Assistant Examiner* — Nicholas Polito
(74) *Attorney, Agent, or Firm* — Laubscher & Laubscher, P.C.

(57) ABSTRACT

Disclosed is a travel pillow for providing the head and neck alignment of a human user resting against a seat back. The travel pillow has an interior shell of a semi-stiff unitary construction. There is a head support region defining a head supporting space for supporting the user's head, a neck support region defining a neck supporting space for supporting the user's neck posteriorly, an enlarged portion bridging together the head support region and the neck support region, the enlarged portion varying in radius from the head support region to the neck support region all elements functioning together as a single unit to maintain the columnar alignment of the user's head directly above the user's neck, and lobes extending upwardly on either side of the head support region to support the head at the intersection of the occipital bone, parietal bone and temporal bones on either side of the head to prevent lateral bending of the neck. The pillow is placed between the user and the seat back, wherein the pillow is held in place during use by the user's weight resting against the seat back. The head support region may be sized and shaped to match the approximate shape of the back of the user's head. The head support region may be transversely curved about the user's vertebral axis and is cut away at the user's occiput such that the user's head rests directly against the seat headrest.

8 Claims, 7 Drawing Sheets

U.S. PATENT DOCUMENTS

| | | | |
|---|---|---|---|
| 6,915,805 B2 * | 7/2005 | Crutchfield | 128/870 |
| 7,197,781 B2 | 4/2007 | Ramsbottom et al. | |
| 7,547,071 B2 * | 6/2009 | Huffman | 297/397 |
| 2005/0102758 A1 | 5/2005 | Ramsbottom et al. | |
| 2009/0211032 A1 | 8/2009 | Lange | |

* cited by examiner fig. 1 fig. 2 fig. 6

6a  6b  6c fig. 7 fig. 8a  fig. 8b fig. 9 fig. 10a  fig. 10b fig. 11 fig. 12 fig. 13

TRAVEL PILLOW PROVIDING HEAD AND NECK ALIGNMENT DURING USE

CROSS-REFERENCE TO RELATED APPLICATION

This application claims the benefit of U.S. Provisional application Ser. No. 61/275,705, filed Oct. 22, 2009, incorporated by reference herein.

FIELD OF THE INVENTION

The present invention relates to a compact travel pillow for a human user while the user is at rest or asleep in a seated position while riding in a transportation vehicle such as an airplane, automobile or train.

BACKGROUND OF THE INVENTION

Sleeping or otherwise resting in a transportation vehicle, such as an airplane, automobile or train can result in pain and stiffness in the neck. Seats on airplanes, cars, trains and buses do not provide specific support for the head and cervical area of the user. This is because users vary in height, proportion and in the severity in the curvature of the neck. Thus, travel pillows are commonly used by passengers to provide increased comfort while riding in such a vehicle.

However, many travel pillows on the market today do not take into account the physical attributes of a human user. While in a typical seated position, the upper part of the body from the torso up to the head is in a mainly vertical position and the muscles of the body are employed and constantly adjust to keep the components of the spine and head balanced and aligned in a vertical column. If a headrest is provided, then the head is supported rearward. During deep rest or sleep, the muscles of the body are entirely relaxed and do not support the vertical positions of the head and neck. Therefore, the force of gravity acting on the head causes it to lean to one side or the other resulting in lateral bending of the neck and causing prolonged strain/stress in the ligaments of the neck and the muscles that support it which induce headaches and pain or stiffness in the neck.

Also, many travel pillows available today are fully inflatable. Such pillows can be difficult, if not impossible, for many users to utilize. It can be very difficult to fully inflate such pillows, especially for the very elderly or ill. Such inflatable pillows also do not provide rigid support that is required to keep the head in the optimal upright position while keeping the device compact.

One such travel pillow available is that disclosed in US2009/0211032A1, which is comprised of three separate shapes that are held together with a bag in different configurations. The shapes are two separate left and right elongated support members and a collapsible connector or intermediate section that transversely spans the distance between the two. Two left and right members are sufficiently flexible such that they are bendable to conform to a particular person's dimensions in the head and neck region. During use, the two members will pull closer toward each other as pressure from a resting head is applied to the middle of the device. Thus, the travel pillow is generally 'bendable'.

Many head supporting pillows are excessively large and therefore are not conducive to modern travel. In efforts by airlines to enhance efficiency, space on commercial airliners is extremely confined and the size and number of carry on items is becoming increasingly limited.

U.S. Pat. No. 6,289,538 to Fidge is an asymmetrical apparatus which supports the head and neck. It comprises a cushion that extends upwardly from at least one of the user's shoulders to at least a portion of the one of the user's ears. The support can include means for varying both the size and shape of the cushion so that its dimensions can be varied during use by an individual user and configured for use by many individuals, thus forcing the user to remain always in the same position. Such device is configured such that it supports the weight of the head by supporting the side of the face and transferring this weight to the shoulder thereby moving the center of gravity of the head away from the saggital plane. One embodiment provides an inflatable bladder designed to enhance the comfort of the user by varying the shape and compressibility of the device while in use. Furthermore the inflatable bladder used is not designed nor is it intended to act as an active device that will affect the user's posture nor is such bladder purposely sized, shaped and placed to specifically affect the natural lordotic curve of the cervical spine and the relative positions head, neck and thoracic areas of the user. There are a number of devices that use trapped air but these elements are intended to enhance the fit and comfort of the surface of the device against the body and do not actively or are purposely designed to alter the anatomical positions of the parts of the body to create new weight bearing relationships between the spine, the occiput and the seat headrest.

There are a number of devices that serve to stabilize movement in the neck but they are mainly for orthopedic treatment and highly restrictive. They are not intended for healthy persons who need freedom of movement, support for the head and breathability for the skin in order to remain comfortable.

U.S. Pat. Nos. 4,708,129; 4,854,306 to Pujals, Jr and 4,034,747 to Leroy are described as cervical collars and are related to an orthopedic or medical apparatus rather than a pillow. These devices limit the user's mobility and restrain the user from rotating the head from side to side without moving the rest of the upper body. Furthermore these devices do not allow the user to move their heads side to side while maintaining the center of gravity along the saggital plane and without disturbing the upper torso area. Neither do they allow the user to rest his/her head directly against a car/airplane/train headrest portion of the seat thus pushing the head further forward than originally intended by the seat designer resulting in tension in the cervical area of the spine and possibly encouraging the head to fall forward if the user is asleep or in a state of deep relaxation.

U.S. Pat. Nos. 4,708,129; 4,854,306 & 4,562,833 to Pujals, Jr are described as a contoured neck brace/collar and cervical orthopedic devices. These collars are best described as orthopedic devices which are used in the treatment and therapy of cervical injuries and traumas. Rigid devices such as these are designed to restrict cervical motion considerably, thus allowing the user to rest without furthering the injuries and allowing them to heal. Patent '833 discloses a device which is held in place by a collar and is not specifically shaped such that it can be held comfortably and securely in between a seat back and the user's upper thoracic region. Furthermore patents '129 & '306 do not allow the user to move or rotate their head side to side while maintaining the center of gravity in balance along the saggital plane and/or without disturbing the upper torso area. Neither do they allow the user to rest his/her head directly against a car/airplane/train headrest portion of the seat thus pushing the head further forward than originally intended resulting in tension in the cervical area of the neck. Furthermore these devices do not have an inflatable bladder acting as a device that actively pushes the middle cervical region forward and backward, relative to the occiput and the thoracic region of the spine.

U.S. Pat. No. 4,285,081 to Price; U.S. Pat. No. 4,034,747 to Leroy; U.S. Pat. No. 5,220,700 to Liu; U.S. Pat. Nos. 4,708, 129; 4,854,306 and 4,562,833 to Pujals, Jr include a back panel which follows the contour of the occiput between the ears and the posterior and lateral neck area. These devices clearly do not allow the user to rest his/her head directly against a car/airplane/train headrest portion of the seat thus pushing the head further forward than originally intended resulting in tension in the cervical area of the spine and possibly encouraging the head to fall forward if the user is asleep or in a state of deep relaxation. Furthermore the devices of '081, '747, '700, '129, '306 and '833 do not have an inflatable bladder acting as an active device that pushes the middle cervical region forward, relative to the occiput and thoracic region of the spine The device disclosed in U.S. Pat. No. 4,034,747 to Leroy is described as a cervical collar which applies body heat to the area of treatment and minimizes pressure upon the brachial plexus. Furthermore the '747 device is made of a flexible and conformable material. It is not constructed of a semi rigid plastic shell nor does it provide any cervical or head support.

U.S. Pat. No. 7,197,781 to Ramsbottom et al. while providing neck support is made of a compressive mould material having memory characteristics. This device is not constructed of a semi rigid plastic shell nor does it provide any head support to prevent lateral bending of the neck.

U.S. Pat. No. 5,974,607 to Smith is claimed to be a head clip pillow designed for being worn about the neck of a user to cover the user's ears in order to eliminate a substantial portion of ambient noise. This device is not constructed of a semi rigid plastic shell and does prevent the user's head from falling to the sides or forward when the user is asleep or in a state of deep relaxation, thus resulting in tension in the cervical area of the spine and neck muscles.

U.S. Pat. No. 6,786,554 to Zahiri discloses an apparatus to support the posterior aspect of the upper and lower portion of the upper thoracic portion of the spine so that the head and neck will remain supported while the individual is asleep. However, the weight of the head is supported by the mastoid processes of the skull. Such devices restrict free movement of the head as it would cause localized pressure on non-matching surfaces of the skull and soft tissue such as the ears, jaw and neck muscles if the user's head is turned.

U.S. Pat. No. 4,805,603 to Cumberland discloses a cervical traction apparatus. Traction is the use of a pulling force to treat muscle and skeleton disorders. All medical traction devices are designed for the purpose of separating the bones of the neck and various parts of the body to elongate the joints in order to relieve pressure. This device cannot function in an upright seated position without the aid of additional straps or other head restraining mechanisms and does not prevent lateral bending of the cervical spine.

SUMMARY OF THE INVENTION

Disclosed is a travel pillow that is compact and provides a fixed support regardless whether the user's head is facing frontal or side to side in a resting mode. A travel pillow in accordance with the teachings of this invention does not impede movement of a user's head but still provides full support of both the user's head and neck to prevent lateral bending. Embodiments of the present invention are designed to provide support to the head and neck while the user is relaxed or asleep in a seated position in a seating device which provides a backrest and a surface to rest the head rearward. The device is fitted between the user's head and neck and the seat and is held in place by the user's weight resting rearward in the seat and on the device. While in this position, the device provides support to the user by maintaining the columnar arrangement of the head with its center of gravity directly above the cervical region of the spine below it and serves to maintain the spine's natural shape thereby alleviating pain associated with prolonged hyperextension of the neck. Embodiments of the invention provide support to the head at the junction of the occipital bone, and the posterior left and right extremities of the parietal bone and the rearward portions of the temporal bones to prevent lateral bending of the neck. Embodiments of the invention are designed to not restrict movement of the head and neck within the body's natural range of motion including lateral rotation. The same surfaces which contact the occipital, parietal and temporal bones also comfortably support the ears and mandible area of the head when the head is turned and resting rearward.

This is in contrast to a brace or other medical device that is meant to provide a tight fit, immobilize the user and support the weight of the skull.

Other embodiments of the invention provide support to the neck and head while the head is facing forward and also turned to the left or to the right by up to approximately 45 degrees in either direction.

Seats on airplanes, cars, trains and buses do not provide specific support for the cervical area of the user. This is because users vary in height and in the severity in the curvature of the neck. Thus embodiments of the invention are designed to be easily moveable, aligned and fine tuned by slight movements of the shoulders and head until it is settled in the exact position that is comfortable for the user without manipulation with the hands.

A travel pillow in accordance with the teachings of this invention is compact, simple to use and is small enough to be carried in a handbag or lady's purse.

By providing a shell of unitary construction, the travel pillow has a design with reduced parts, which in turn reduces manufacturing cost to achieve a similar result. Since the head and neck and the proportions thereof of users of the device is similar, a single unitary shell that accommodates the maximums and minimums of this range is most efficient. Embodiments of a travel pillow in accordance with the teachings of this invention will accommodate at least the 90th percentile. The general shape of the shell remains constant and is therefore simple, predictable and reliable to the user.

In some preferred embodiments, an air-inflatable bladder is provided as an added support. A bladder is fitted onto the interior of the shell at the cervical area which is inflatable and adjustable via an on-board manual pump and air-release valve. This bladder is specifically sized, shaped and placed to purposely change the relative positions of the back of the occipital bone, the thoracic area of the spine and the vertebrae of the neck especially vertebrae c3 to c5 exclusively along the saggital plane which is the plane that divides the body into the left and right hemispheres. Expanding or contracting the bladder in varying degrees will actively adjust the position of this area of the user's neck forward to back thereby changing the positions of the supporting vertebrae and the severity of the natural lordotic curve of the cervical region relative to the head's center of gravity. This will cause a change in the pitch of the head through its natural range of motion during extension of the neck thereby varying the weight of the head against the seat's headrest while maintaining the center of gravity along the saggital plane. This position of the head's center of gravity along the body's center plane is maintained even while the head is turned to the left or to the right. Maintaining the center of gravity at the saggital plane helps to preserve the columnar relationship of the head and neck keeping them in balance. This adjustment can be changeably and easily tuned until the user finds his/her preferred position in controlling the proportion of weight which is being supported by the body and that which is being supported by the seat's headrest.

Thus, according to one aspect, the invention provides a travel pillow for providing the head and neck alignment of a human user resting against a seat back. The travel pillow has an interior shell of a semi-stiff unitary construction. There is a head support region defining a head supporting space for supporting the user's head, a neck support region defining a neck supporting space for supporting the user's neck posteriorly, an enlarged portion bridging together the head support region and the neck support region, the enlarged portion varying in radius from the head support region to the neck support region all elements functioning together as a single unit to maintain the columnar alignment of the user's head directly above the user's neck, and lobes extending upwardly on either side of the head support region to support the head at the intersection of the occipital bone, parietal bone and temporal bones on either side of the head to prevent lateral bending of the neck. The pillow is placed between the user and the seat back, wherein the pillow is held in place during use by the user's weight resting against the seat back.

The head support region may be sized and shaped to match the approximate shape of the back of the user's head. The head support region may be transversely curved about the user's vertebral axis and is cut away at the user's occiput such that the user's head rests directly against the seat headrest.

The lobes at either end preferably cradle the user's head as it moves through varying positions from 45 degrees to the side one way, through center forward facing, to 45 degrees to the side the other way preventing lateral bending of the user's cervical region of the spine and maintaining the head's center of gravity at the saggital plane of the body. End portions may be sized such that the user's ears do not contact the travel pillow when the head is at least in the center forward facing position. Parts of the user's face may rest against the lobes while the head is at a 45 degree position turned to either side to distribute any forces from the weight of the head against the travel pillow and the headrest of the seat and to guide the center of gravity of the head toward the body's saggital plane.

The travel pillow further comprises an inflatable, variable pressure bladder in the neck support region to adjust the position of the user's neck by adjusting the severity of the natural lordotic curve of the cervical region of the spine, thereby rearranging the distribution of the head's weight between the spinal column, the bearing areas of the pillow and the seat's headrest. There may be padding at the neck support region and/or the lobes of the head support region. There may be a series of molded grooves in the head support region or grooves that traverse the span between the enlarged portion to the lobes of the head support region to increase rigidity. There may also be a rubberized or traction enhancing covering that serves to create traction against a seat or headrest to mitigate movement of the device due to slippage.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Disclosed are two embodiments of a travel pillow in accordance with the teachings of this invention. Each embodiment provides a support for the user's head and includes lobes at the intersection of the occipital bone, parietal bone and temporal bones on either side of a user's head to prevent lateral bending of the neck.

A first embodiment is disclosed in FIGS. 1 to 6. There is shown the shape of an interior shell 1 for one embodiment of a travel pillow in accordance with the teachings of this invention. It can be seen that the interior shell 1 is comprised of a stiff semi-cylindrical shape and has a head support region 10 and neck support region 20. The interior shell 1 is of a unitary construction. An advantage of having one unitary shell as the major structure is that it simplifies the design of the product thereby reducing parts of the assembly which in turn reduces manufacturing cost to achieve a similar result.

Figure 1:
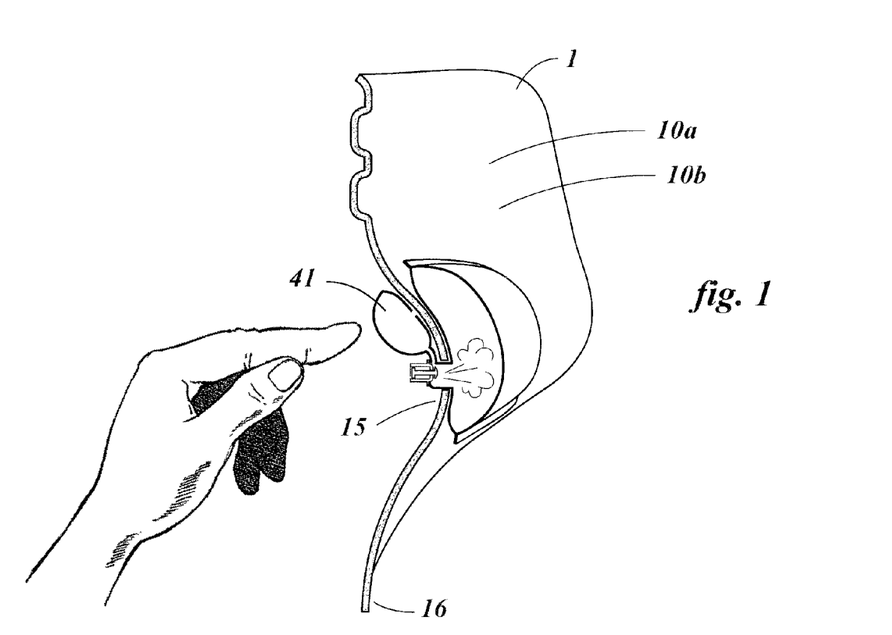
FIG. 1 illustrates a sectional view of the interior shell for a first embodiment of a travel pillow in accordance with the teachings of this invention.

Preferably the shell 1 is made of a thermoplastic material such as polyethylene, polypropylene or polystyrene. The shell 1 is preferably manufactured using common plastic molding techniques such as thermoforming/vacuum forming, injection molding or blow molding. The shell 1 is generally rigid although plastic may flex slightly.

Figure 2:
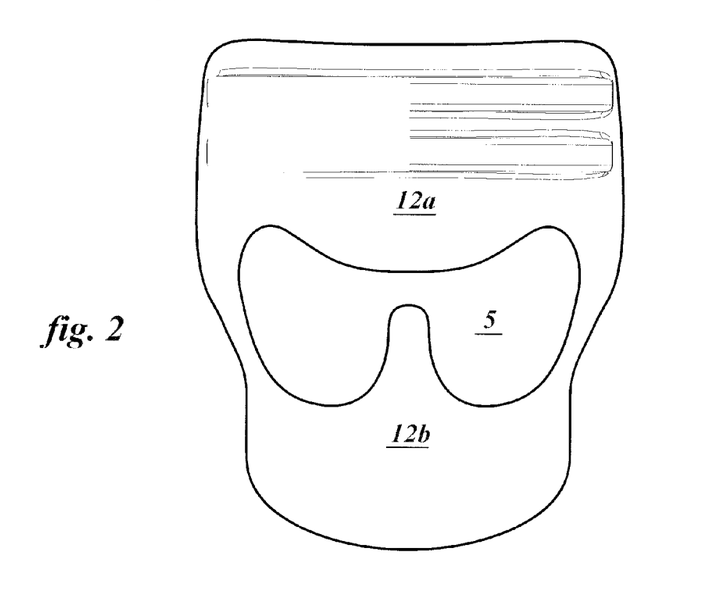
FIG. 2 is a front view of the interior shell of FIG. 1.

The head support region 10 is curved to define a support space 12a sized and shaped to match the approximate shape of the back of the skull or head 2 of a human user 30. The neck support region 20 is curved to define a support space 12b sized and shaped to match the approximate shape of a user's neck 6 and where the neck meets the upper thoracic 16. The top portion 10a of head support region 10 may optionally have a series of grooves 10b therein. The grooves 10b when present may serve as stiffeners to add more rigidity to certain areas of the shell 1.

The interior shell 1 varies in radius as it extends downward from the head support region 10 to the neck support region 20 to also match the cervical region 3 of the spine 6. The structural shell 1 defines an enlarged portion 14 at the head support region 10 and defines an inward tapered curve 15 down towards the start of the neck support region 20. The neck support region 20 terminates at a curved bottom portion 16.

The structural shell 1 may or may not have additional padding 4 at the head support region 10 and padding at the neck support region 20. If used, preferably the padding 4 comprise a flexible material or combination of materials on the interior surface to provide further conformance to the features of the user's head. The padding may be made of closed or open cell polyurethane, expanded polyethylene, expanded polypropylene, expanded polystyrene or blends, or natural fiber batting such as cotton or synthetic fiber.

Figure 3:
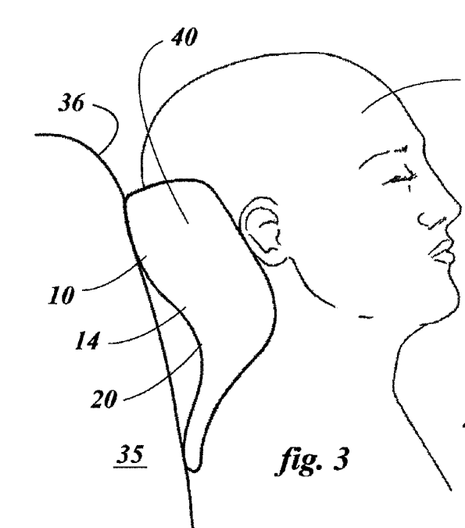
FIG. 3 illustrates use of a travel pillow using the shell of FIG. 1 in accordance with the teachings of this invention.
Figure 4:
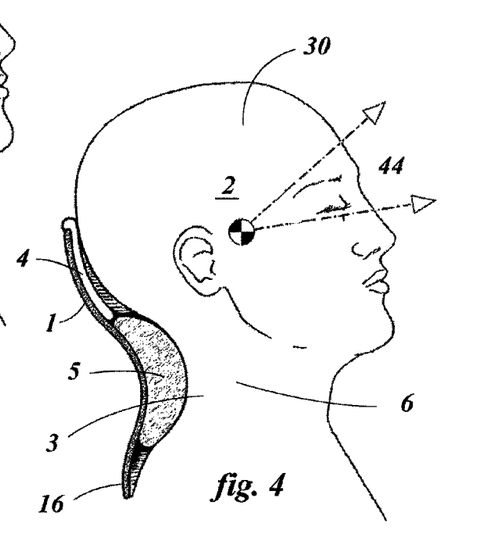
FIG. 4 illustrates use of the travel pillow of FIG. 3, showing internal components thereof.
Figure 5:
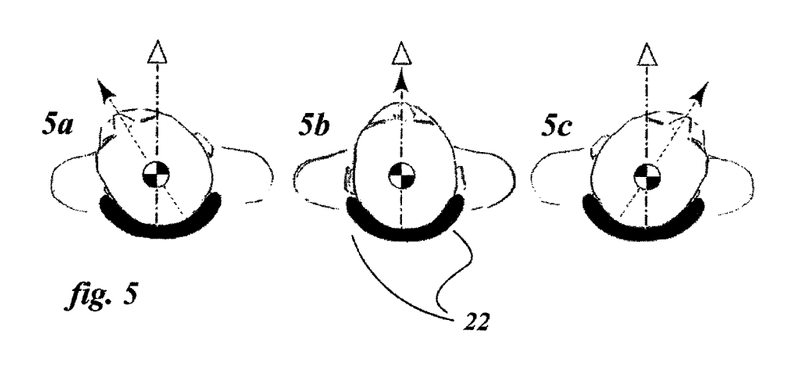
FIGS. 5a, 5b, and 5c illustrate use of a travel pillow in accordance with the teachings of this invention as a user's head moves from side to side.
Figure 6:
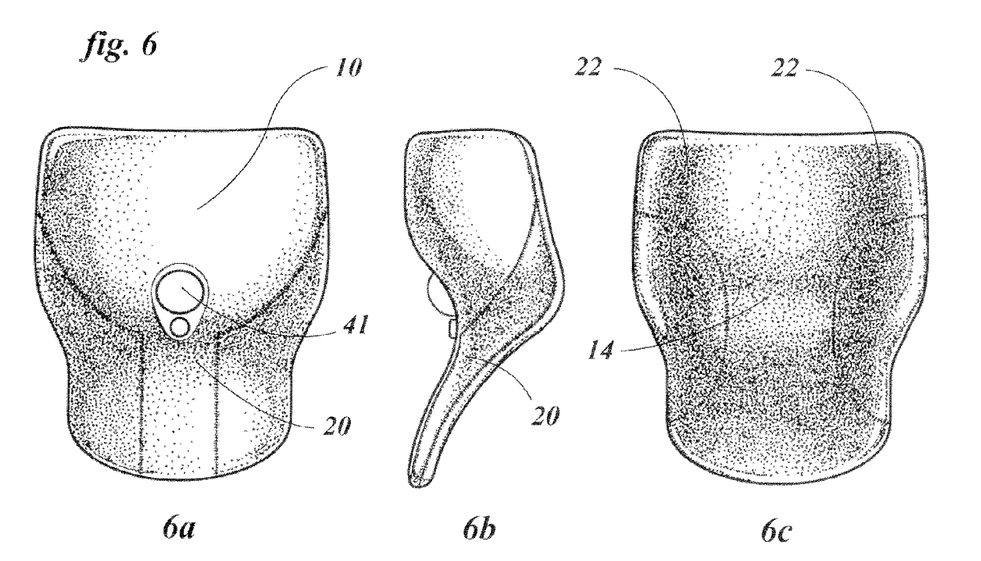
FIGS. 6a, 6b and 6c illustrate a front, side and rear view respectively of the travel pillow of FIG. 3.
Figure 7:
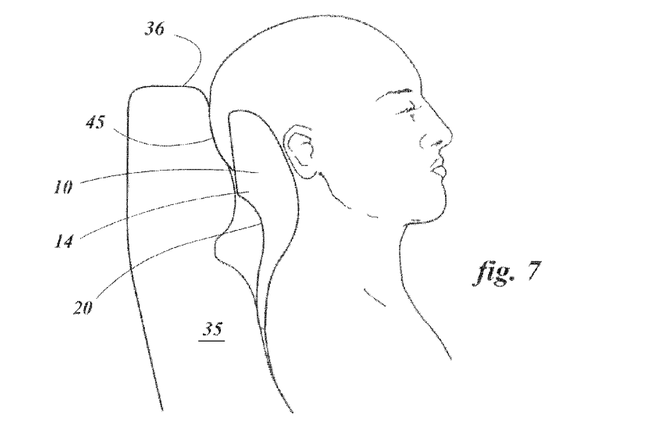
FIG. 7 illustrates the use of a second embodiment of a travel pillow in accordance with the teachings of this invention.
Figure 8A:
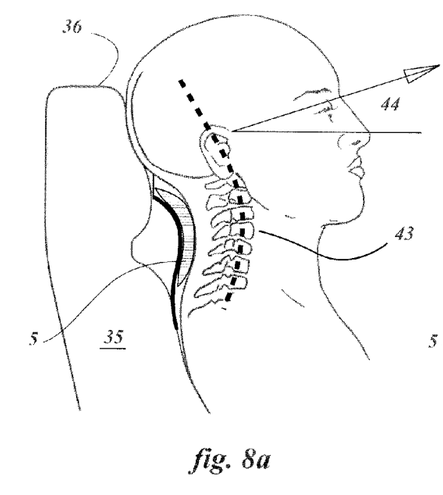
FIGS. 8a and 8b illustrate use of the travel pillow of FIG. 7 as a user's head moves from level pitch to extension of the neck.
Figure 8B:
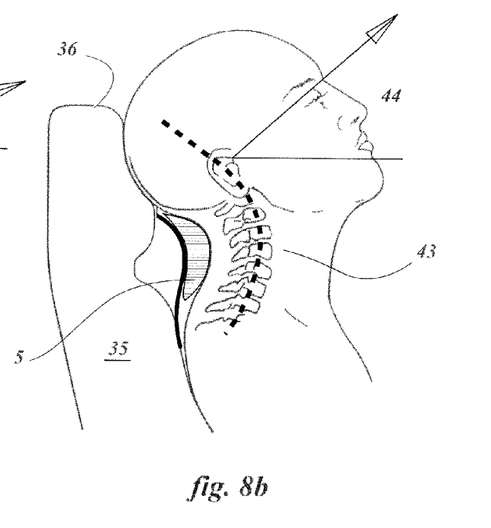

Embodiments of a travel pillow 40 in accordance with the teachings of the present invention are designed to provide support to the head 2 and neck 6 while the user 30 is relaxed or asleep in a seated position in a seating device 35 which provides a backrest and headrest 36 to rest the head rearward. The travel pillow 40 is fitted between the user's head and neck and the seat 35 and is held in place by the user's weight resting rearward in the seat 35 and on the travel pillow 40. While in this position, the travel pillow 40 provides support to the user 30 by maintaining the columnar arrangement of the head 2 directly above the cervical region 3 of the spine below it and serves to maintain the spine's natural shape thereby alleviating pain associated with prolonged hyperextension and contortion of the neck.

Since the head and neck and the proportions thereof of users of the travel pillow in accordance with the teachings of this invention is similar, a single unitary shell that accommodates the maximums and minimums of this range is most efficient. Preferably a travel pillow 40 in accordance with the teachings of this invention is sized and shaped to accommodate at least the 90th percentile. The general shape of the shell remains constant and is therefore simple, predictable and reliable to the user. The major lateral arc of the shell 1 is designed sufficiently large enough to accommodate the largest user that falls within the 90th percentile of the human population.

Another challenge faced by the present invention is that fact that the activity of rest or sleep is a dynamic activity. Thus, referring to FIGS. 5a, 5b, and 5c, the travel pillow in accordance with the teachings of this invention provides support to the neck 6 and head 2 while the head 2 is facing forward (FIG. 5b) and also turned to the left (FIG. 5a) or to the right (FIG. 5c) by up to approximately 45 degrees in either direction. This is provided by lobes 22=extending upwardly and outwardly up from the head support region 10 on either side. Lobes 22 are the extremities of a continuous arc of head support space 12a whose axis is approximately at the user's spine. Lobes 22 are shaped to cradle the user's head 2 in any position ranging from 45 degrees to the left through to 45 degrees to the right while gently guiding the center of gravity of the head towards the body's saggital plane.

In this embodiment, the lobes 22 do not extend up to the user's ears while the user is facing forward, thus ensuring the travel pillow 40 does not irritate the user. The user is able to rest the rearward side of the head against the left or right lobes 22 of the pillow including contact with the ears and jaw when the head is turned. This allows maximum contact with the side of the head thus distributing any load over a wider area. The lobes 22 are fixed and do not pull closer to one another when weight is applied to the middle of the travel pillow 40 thereby allowing the user to progressively settle into their own optimal position.

Figure 13:
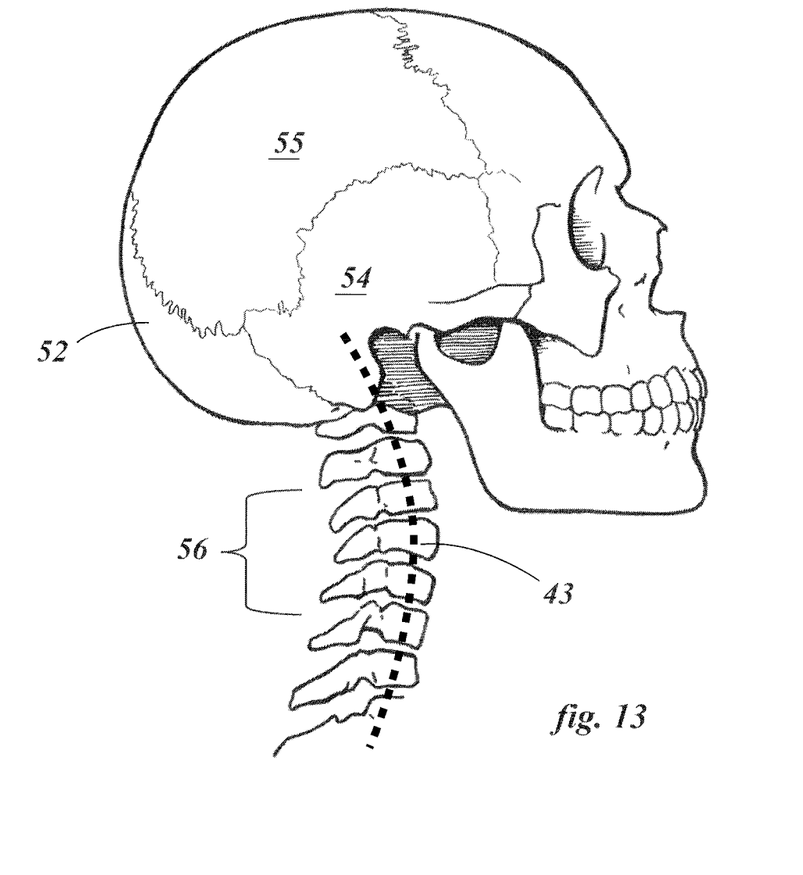
FIG. 13 is a side view of the bones of the human skull and the vertebrae of the neck.

Lobes 22 and which provide support when the user's head is turned left or right by up to approximately 45 degrees remain rigid and act as surfaces upon which the user can rest their head. The user is free to roll, tilt or nestle within the confines of the support in order to settle into the position determined most comfortable and is also free to disengage and/or easily reposition as desired. Referring to FIG. 13, these upwardly protruding lobes 22 support the head at the intersection of the occipital bone 52, parietal bone 55 and temporal bones 54 on either side of the head and maintain the center of gravity 49 of the head within the saggital plane 48 of the body to prevent lateral bending of the neck when the user is asleep or in deep relaxation.

While the user's ears may not necessarily touch the travel pillow 40 while the head is in the forward facing position, the user's ears and parts of the jaw or cheek may rest against lobes 22 while the head is turned to the side by up to approximately 45 degrees. This provides maximum surface area on which to distribute any forces from the weight of the head against the device.

To expand the function of the device and enhance the fit and comfort of the user, an inflatable bladder 5 which varies the size and shape of the cervical support may preferably be added to the travel pillow 40. The travel pillow 40 may or may not have one or more inflatable bladders 5 fixed onto the interior surface of the shell 1 in the region of the cervical area of the user's spine in the neck support region 20. The air pressure inside the bladder/s 5 can be adjusted with a small on board pump and valve 41 attached to the shell 1 and which can be pumped using the fingers. Thus, even with the bladder, the travel pillow 40 can be used by elderly and/or ill users. The inflatable, variable pressure bladder in the neck support region is specifically sized and shaped to adjust the position of the user's neck by adjusting the severity of the natural lordotic curve 43 of the cervical region of the spine, especially at vertebrae C3-C5 56, thereby rearranging the distribution of the head's weight between the spinal column, the bearing areas of the pillow and the seat's headrest.

Bladder 5 is specifically located and dimensioned to provide gentle pressure against the cervical region of the spinal column 6 when the head and neck are placed in the travel pillow during use. This pressure against the cervical region 6 of the neck adjusts the support to the user's neck at vertebrae C3-C5 56 and thereby changes the pitch 44 of the user's head. The bladder 5 is placed in the curve of the shell corresponding to the cervical region 6 of the user's neck to affect the pressure exerted on the neck at vertebrae C3-C5 56. The pressure within the bladder may be adjusted via the finger actuated pump and release valve 41 while maintaining contact with the head and neck to enable the user to determine the proper pitch 44 of the head for their own comfort in real time. While the mastoid processes may be in contact with this bladder, it is not the intended function of the bladder to support the head. The bulk of the weight of the user's head is still supported at all times mainly by the user's own spinal column and the travel pillow 40 is intended to maintain its vertical arrangement.

The present inventor has discovered upon further study has increasingly shown that the adjustable bladder 5 supporting the cervical area of the neck greatly enhances the overall utility and benefit to the user. It benefits the user by allowing them to adjust the pitch 44 of the head by pushing the cervical region forward to adjust the severity of the cervical spine's natural lordotic curve 43. The same element also allows for accommodation of different users whose features and proportions vary in size and shape.

Most existing seats on airplanes, cars, trains and buses which are provided with backrests and headrests are designed to comfortably support the human user's weight rearward against the seat. The lower back is normally provided with some kind of convex surface supporting the lumbar region, the upper back is supported at the scapular/thoracic area and the head is supported at the occipital area of the skull. In order to be comfortable, the planes or surfaces that support these regions of the back and head are placed at specific distances forward to back relative to one another so that they maintain the user's proper posture.

Thus referring to FIGS. 7 to 12, it is a preferred embodiment of the invention that occiput 45 is allowed to rest directly against the headrest 36 portion of the seat 35. This embodiment in accordance with the teachings of the present invention is still also designed to provide support to the head 2 and neck 6 while the user 30 is relaxed or asleep in a seated position in a seating device 35 which provides a backrest and headrest 36 to rest the head rearward.

Figure 9:
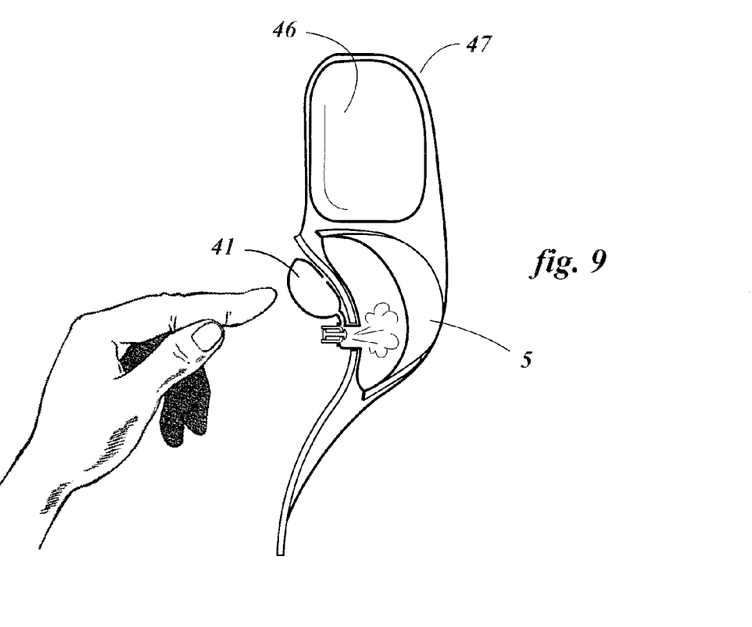
FIG. 9 illustrates a sectional view of the interior shell for the travel pillow of FIG. 7.

The travel pillow has a semi-rigid plastic shell 47. The interior shell 47, like shell 1 is of a unitary construction made of a stiff semi-cylindrical shape. Preferably, the shell 47 is made of a thermoplastic material such as polyethylene, polypropylene or polystyrene. The shell 47 is preferably manufactured using common plastic molding techniques such as thermoforming/vacuum forming, injection molding or blow molding. The shell 47 is generally rigid although plastic may flex slightly.

The shell 47 is shaped to define a head support region 10 with head support space 12a that is transversely concave about the vertebral axis beginning at the bottom neck support region 20 and extending upward and cut away at the occiput. In this way, instead of having the user's head resting rearward against the pillow, the head is resting directly against the seat back while still being supported by head support region 10. The neck support region 20 is curved to approximate the back of the neck at the neck support space 12b. enlarged portion 14 bridges head support region 10 and neck support region 20.

Figure 10A:
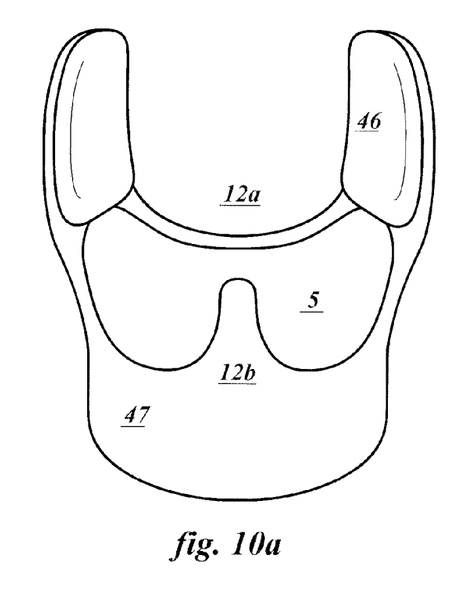
FIG. 10a is a front view of the interior shell of FIG. 9.
Figure 10B:
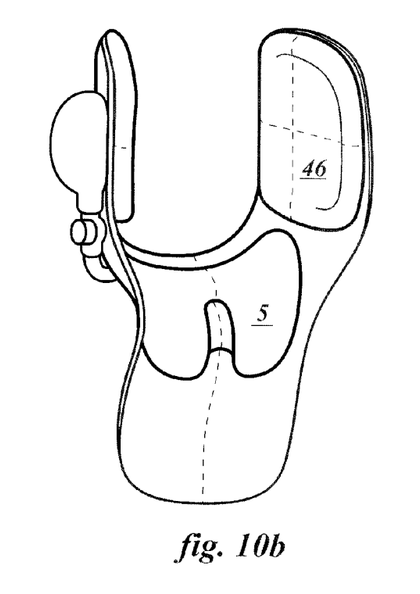
FIG. 10b is an isometric view of the interior shell of FIG. 9.
Figure 11:
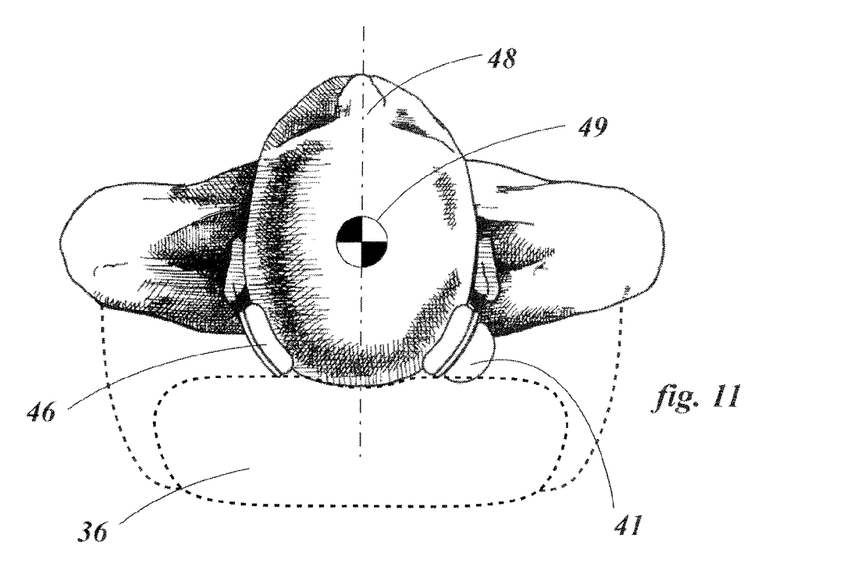
FIG. 11 illustrates, in a top view, the use of the travel pillow of FIG. 7.
Figure 12:
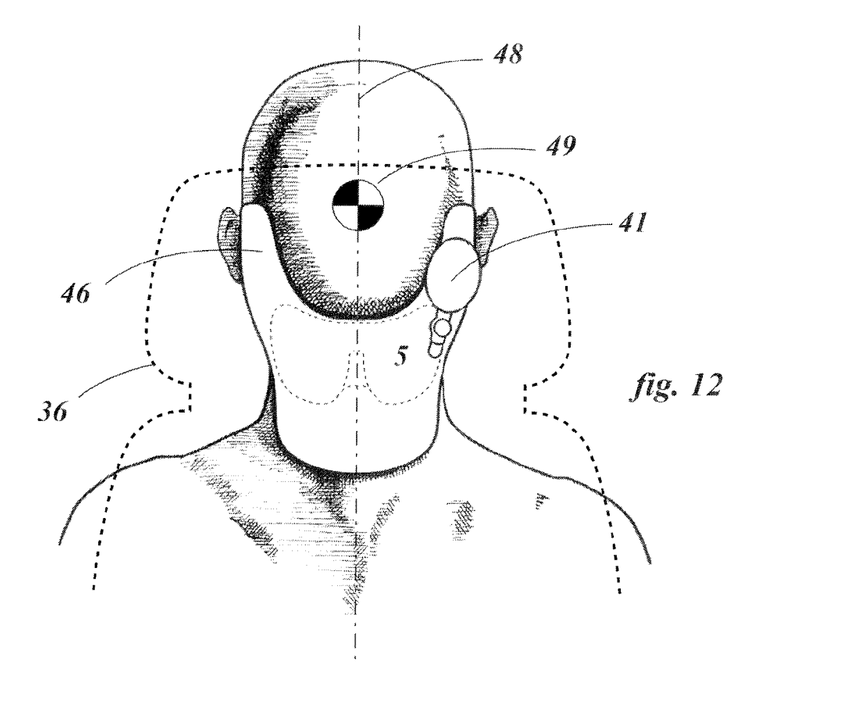
FIG. 12 is a back view of the travel pillow of FIG. 11.

Referring to FIG. 13, extending laterally and upwardly along the curve of head support region 10 towards the left and right sides are lobes 46 that curve inward such that their surfaces are parallel to the occipital bone 52 and the temporal bones 54 of the head. These upwardly protruding lobes 46 support the head at the intersection of the occipital bone 52, parietal bone 55 and temporal bones 54 on either side of the head and maintain the center of gravity 49 of the head within the saggital plane 48 of the body when the user is asleep or in deep relaxation to prevent lateral bending of the neck. Lobes 46 function the same as lobes 22 of the first embodiment. The general shape of the device in this embodiment in the front view is a Y (see FIG. 10) where the two prongs support the head from lateral bending and the stem is pressed between the user's back and neck to maintain its position and give forward resistance to the neck.

Each embodiment provides a travel pillow with lobes 22 or 46 to support the head at the intersection of the occipital bone, parietal bone and temporal bones on either side of the user's head to prevent lateral bending of the neck.

Shell 1 and 47 of each embodiment have similar characteristics. And either embodiment can have any combination of bladder 5, additional padding 4, and grooves 10b.

The interior shell 1 or 47 in either embodiment can be covered by a flexible knit material to form travel pillow (for the first embodiment, this is shown in FIGS. 6a, 6b and 6c).

The knit material gives some degree of comfort to the user and may serve to hold the padding 4 or bladder 5 if they are present. It can be made of materials such as knit cotton or cotton blends, Dacron or rubberized fabric such as neoprene. Materials such as rubber can serve to create traction against a seat or headrest 36 to mitigate movement of the device due to slippage.

Numerous modifications may be made without departing from the spirit and scope of the invention as defined in the appended claims.

What is claimed is:

1. A travel pillow for providing the head and neck alignment of a human user resting against a seat back, the travel pillow comprising:
    an interior shell of a semi-stiff unitary construction;
    a depending back portion for insertion between the upper part of the user's back and the seat back;
    a neck support region for supporting the user's neck posteriorly, the neck support region comprising a forwardly convex surface varying in radius and configured to extend towards the natural lordotic curve of the cervical region of the user's spine; and
    a head support region comprising a pair of upstanding side lobes extending from each side of the neck support region and sized to terminate above the user's ears, the side lobes configured to follow the profile of the occipital and temporal bones of the user's head and support the head at the intersection of the occipital bone, parietal bone and temporal bones to prevent lateral bending of the neck, and a rearward transversely concave surface for supporting the user's occipital bone and defining a deep U-shaped recess between the side lobes to allow the user's head to rest against the seat back; and
    wherein during use the pillow is placed between the user and the seat back; such that the pillow is held in place during use by the user's weight resting against the seat back; and
    wherein the side lobes are configured to cradle the user's head as it moves through varying positions from 45 degrees to the side one way, through center forward facing, to 45 degrees to the side the other way preventing lateral bending of the user's cervical region of the spine and maintain the head's center of gravity at the sagittal plane of the body.

2. The travel pillow of claim 1, wherein the side lobes are sized such that the user's ears do not contact the travel pillow when the head is at least in the center forward facing position.

3. The travel pillow of claim 2, wherein parts of the user's face may rest against the lobes while the head is at a 45 degree position turned to either side to distribute any forces from the weight of the head against the travel pillow and the headrest of the seat and to guide the center of gravity of the head toward the body's saggital plane.

4. The travel pillow of claim 1, further comprising an inflatable, variable pressure bladder in the neck support region to adjust the position of the user's neck by adjusting the severity of the natural lordotic curve of the cervical region of the spine, thereby rearranging the distribution of the head's weight between the spinal column, the bearing areas of the pillow and the seat's headrest.

5. The travel pillow of claim 4, further comprising padding at the neck support region and/or the lobes of the head support region.

6. The travel pillow of claim 4, further comprising a series of molded grooves in the head support region or grooves that traverse the span between the enlarged portion to the lobes of the head support region to increase rigidity.

7. The travel pillow of claim 1, further comprising padding at the neck support region and/or the head support regions.

8. The travel pillow of claim 1, further comprising a rubberized or traction enhancing covering that serves to create traction against a seat or headrest to mitigate movement of the device due to slippage.

\* \* \* \* \*